UNITED STATES PATENT OFFICE.

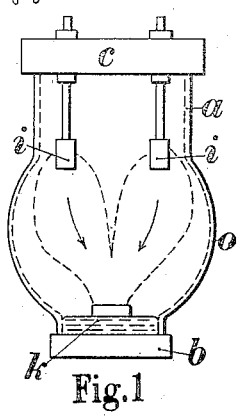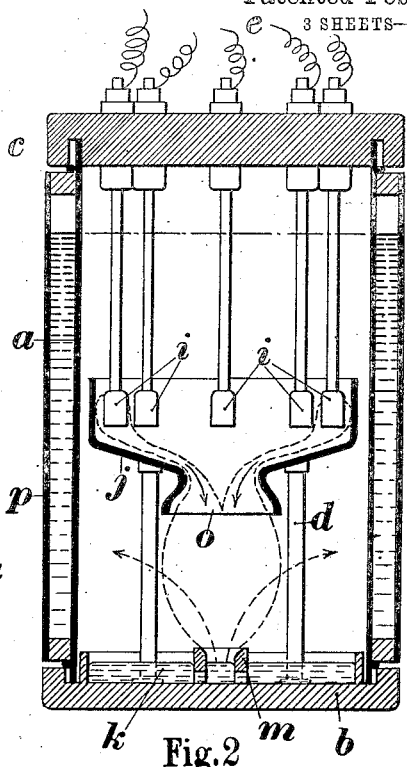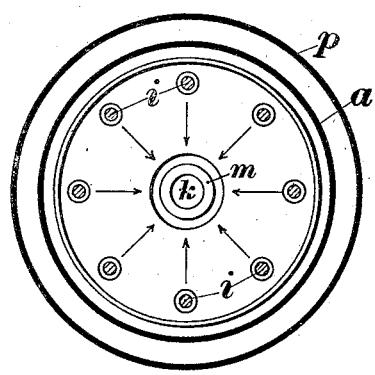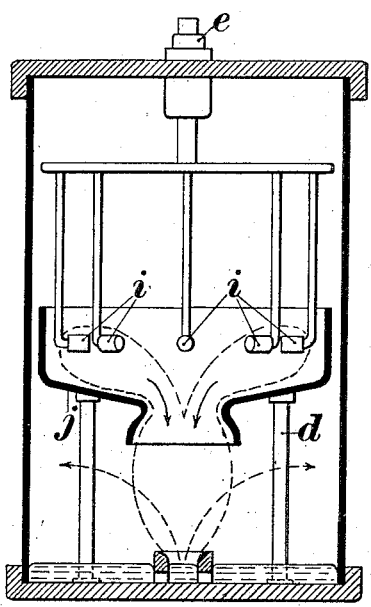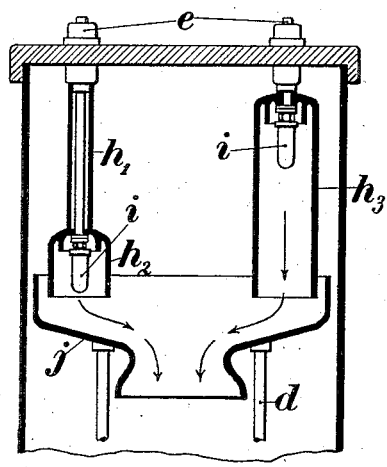

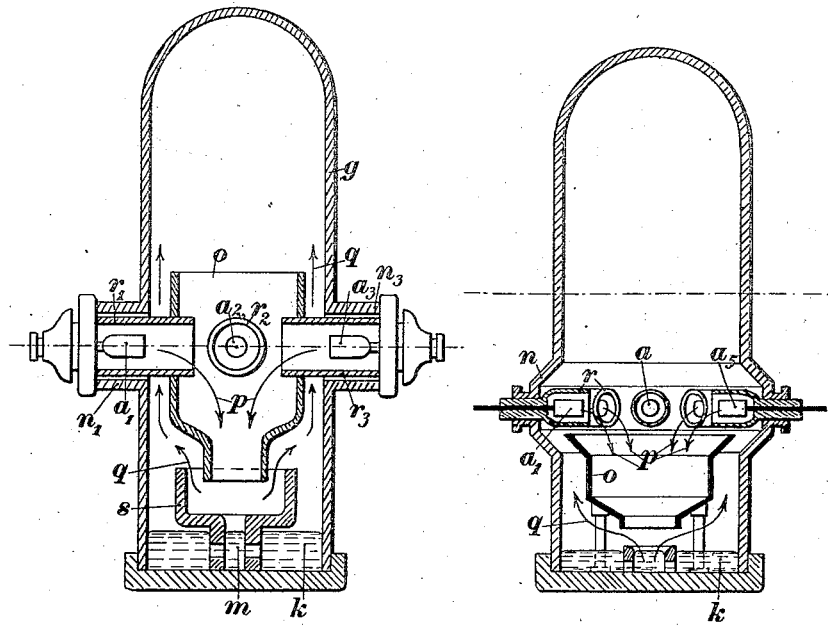

BÉLA SCHAEFER, OF FRANKFORT-ON-THE-MAIN, GERMANY, ASSIGNOR TO THE FIRM OF HARTMANN & BRAUN A. G., OF FRANKFORT-ON-THE-MAIN, GERMANY.

VAPOR ALTERNATING-CURRENT RECTIFIER AND SIMILAR APPARATUS.

1,126,877. Specification of Letters Patent. Patented Feb. 2, 1915.

Application filed March 1, 1912, Serial No. 680,815. Renewed June 15, 1914. Serial No. 845,295.

*To all whom it may concern:*

Be it known that I, BÉLA SCHAEFER, a citizen of the German Empire, and resident of Frankfort-on-the-Main, Germany, have invented certain new and useful Improvements in Vapor Alternating-Current Rectifiers and Similar Apparatus.

This invention relates to improvements in rectifiers for changing an alternating to a direct current through the action of a metallic vapor and the principal object of the invention is to provide means for controlling the arc path between the mercury commonly used to form the cathode and the anode common in such apparatus.

Figure 10:
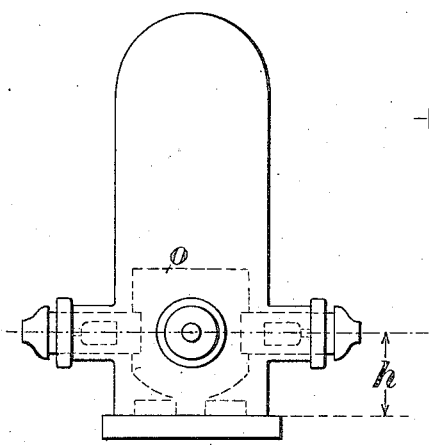
Figure 11:
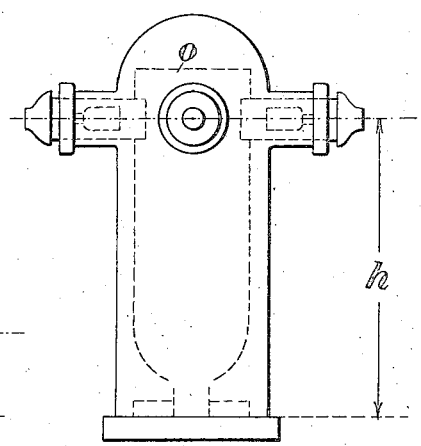
Figure 12:
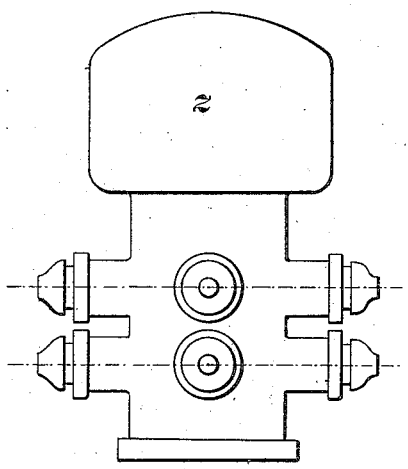
Figure 13:
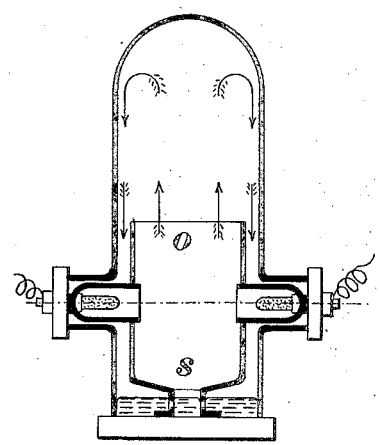

In the accompanying drawings, like characters of reference indicate like parts in the several views, and Figure 1 is a diagrammatic elevation of a rectifier of the usual type, disclosing the well-known path of the light arc. Fig. 2 is a rectifier provided with metallic walls insulated from the cathode, and disclosing also the anodes as being introduced independently and vertically into the vacuum vessel. Fig. 3 is a horizontal section therethrough taken just above the guiding funnel. Fig. 4 shows a modified arrangement, but disclosing the anodes as being introduced into the vacuum vessel as by means of a common leading-in conductor. Fig. 5 shows a further modification, wherein the anodes are surrounded by certain tubes arranged vertically. Fig. 6 is a vertical section through a fifth modification wherein the anodes are surrounded by tubes arranged horizontally. Fig. 7 is a horizontal section through the modification shown in Fig. 6, the section being taken through the tubes. Fig. 8 is a further modification, shown in vertical section, of a type similar to that disclosed in Fig. 6 but provided with a greater number of anodes and having a modified guiding funnel. Fig. 9 is a horizontal section through the modification shown in Fig. 8. Fig. 10 is a side elevation of a modification somewhat similar to that disclosed in Fig. 6, wherein the distance between the anodes and the cathode is decreased vertically. Fig. 11 shows a further modification, wherein the distance between the anodes and the cathode is increased vertically. Fig. 12 is a side elevation of a form wherein a double series of anodes is employed; and, Fig. 13 is a vertical section through a modification closely resembling that shown in Fig. 10 and disclosing the current path.

In the familiar structure shown in Fig. 1, there is disclosed a vacuum vessel or container for the anodes and cathode. This vessel consists of the body —$a$—, which is usually of some insulating material, such as glass or porcelain, and the vessel is hermetically sealed at the top and bottom by means of the closures —$b$— and —$c$— removably secured to the body so as to be detachable therefrom. The body —$a$— is provided with an enlarged portion —$o$—, and the anodes are spaced from the axis as indicated at —$i$— so that the arc path has unrestricted freedom between said anodes —$i$— and the cathode —$k$—.

As will be clearly seen from the foregoing, the various normal light-arcs arising between the electrodes —$i$— and —$k$— have a tendency to extend laterally and toward the vessel wall, thereby to cause, in the case of a vessel having metal walls, direct flashes between the solid electrodes and the vessel wall, the latter consequently taking an extensive amount of heat from the light-arc, a condensation of the cathode vapors being thus prevented. For these reasons, the arrangement shown in Fig. 1 has not been found adequate for metal vapor apparatus of large capacities.

The present invention has for its primary object to correct these disadvantages, as will be hereinafter explained.

In the embodiment of the invention shown in Fig. 2, there is provided a metallic vessel constituting preferably a metallic cylinder —$a$—. The cylinder is closed at the bottom by a closure —$b$— having two peripheral flanges, one, the outer flange, to take about the lower portion of the cylinder, and the other, the inner flange, to surround the bed of cathode-material. This closure supports a centrally-disposed ring-shaped member, as, for instance, the cup —$m$—, arranged to confine the cathode spot. Through the top —$c$— depend the connections for the anodes —$i$—, and the cylinder has its side wall preferably surrounded with a jacket —$p$—. The anodes $i$ are circularly arranged in proximity to the wall —$a$—.

The embodiment just partially described is preferably used in rectifiers of large capacity. Since, however, the close proximity of the anodes to the vessel wall (these parts being of opposite polarity), entails the flashes and incidental disadvantages already referred to, and, since moreover, it is desirable to give the light-arc a strictly prescribed path, means are here provided for obviating these disadvantages. These means include here a guiding screen or cooling vessel —j— to embrace the anodes and to guide any existent light-arc to the axis of the vessel whereby the arcs are collected into a common path and led to the middle of the cathode. As clearly appears, the guiding screen —j— serves not only to prevent the individual light-arcs from striking the vessel wall, thus to avoid any discharge between the anodes and the wall, but the central opening —o— protects the anodes against the destructive influence of the so-called negative flame, the latter being forced to rise perpendicularly upward without touching the anodes. A further advantage attained by this arrangement is due to the fact that a great portion of the vaporized but electrically-non-conducting cathode-material already below the opening is deflected laterally and separated from the path of the light-arc, whereby the security of service is considerably increased. The guiding screen, which preferably assumes the shape of a funnel, is supported upon insulating-rods —d— and is formed itself of any suitable material, and preferably of insulating material.

The lower end of the funnel is provided with a flaring mouth —o— so as not to interfere with the expansion of the arc formed by the conjunction of the several arcs between the anodes and cathode. By means of this construction, the vapor rising from the cathode will be deflected in part toward the wall —a— and in part will be confined to the axis of the container and rise above the anodes —i— to a point where the insulating top —c— will deflect it toward the wall —a— so that it will condense and run down the latter.

In the modification shown in Fig. 4, an arrangement of the anodes different from that of Fig. 2 is disclosed, in that the anodes, in addition to their association with a common leading-in conductor, are bent so as to be horizontally disposed, as shown; while in the modification shown in Fig. 5, the conductor to each anode —i— is either surrounded by a tube —$h_1$— having an enlarged end —$h_2$— which encompasses the anode itself, or the conductor is shortened and the tube surrounding the anode is lengthened as at —$h_3$— so as to provide a relatively long path for the arc, the hood —$h_2$— being preferably utilized in the presence of low pressures and the hood —$h_3$— preferably in the presence of high pressures.

It is to be observed that in either of the forms shown in Figs. 2 to 5 inclusive, a wall —p— may surround the wall —a— and the space between be filled with a cooling liquid.

In the form shown in Figs. 6 and 7, the metallic container is illustrated at —g— and has a rounded top. Furthermore, this container is provided with lateral extensions —$n_1$—, —$n_2$—, —$n_3$—, and —$n_4$— which contain the anodes —$a_1$— to —$a_4$—, the latter being protected by hoods in the form of tubes —$r_1$— to —$r_4$— which project into a single vertically-arranged guiding tube or shield —o— corresponding in effect to the shield —j— of the previous forms. This shield has its lower end or neck extending into the enlarged upper portion —s— of the member —m— as illustrated and which serves to control the movement of the cathode spot over the surface of the cathode —k—. The paths of the arcs in this form are shown by the arrows —p— while the path of the non-conductive metallic particles is shown by the arrows —q—.

In the form shown in Figs. 8 and 9, the hoods —r— are multiplied in number and these hoods do not traverse the wall of the shield or collecting vessel —o— but terminate at its upper edge.

In the form shown in Figs. 10 and 13, the neck —s— forms a substitute for the member —m— and the shield —o— is either short as shown in Fig. 10 or lengthened as shown in Fig. 11. In this embodiment, the shield —o— is continued downwardly and passes without interruption into a confining tube (as, for instance, the tube —s—, Fig. 13).

In the form shown in Fig. 12, a double row of anodes, as a desirable construction for use in the presence of high intensities is employed, but in other respects the devices shown in Figs. 10, 11, 12 and 13 are the same, except that in Fig. 12 the upper end of the container is enlarged as at —z— to form a condensing chamber.

It is to be observed that the distance between the anodes and the cathodes is of course varied according as to whether high tension or low tension currents are employed.

Having thus described the invention, what is claimed as new is:—

1. In a rectifier of the class described, a closed container including a side wall, a plurality of anodes arranged in spaced relation to the axis of the container and adjacent said side wall, a cathode in the bottom of said container, a screen interposed between said anodes and the side wall, and a funnel extending downward from the lower end of said screen.

2. In a rectifier of the class described, a plurality of anodes, a hood surrounding each anode and provided with an open mouth, a shield within which the mouths of said hoods are received, said shield having a centrally-disposed opening, and a cathode below said shield.

3. In a rectifier of the class described, a plurality of anodes, a hood surrounding each anode, a shield having a centrally disposed opening, and a cathode below said shield.

4. In a rectifier of the class described, a plurality of anodes, a hood surrounding each anode, a shield having a centrally disposed opening, and a cathode below said shield, said hoods each having an opening arranged to overlie the space inclosed by the horizontal limits of said shield.

5. In a rectifier of the class described, a cathode, a plurality of anodes above said cathode and concentrically arranged in relation thereto, a hood surrounding certain of said anodes, a vertically arranged shield located above said cathode and extending upwardly toward the hoods surrounding said anodes.

6. In vapor electric apparatus, a closed container, a mercury cathode in the bottom thereof, a plurality of anodes above said cathode and concentrically arranged with relation thereto, and an inclosure of insulating material surrounding and confining the arc path between an anode and the mercury surface within said inclosure, 7. In a vapor electric apparatus, a closed container, a cathode in the bottom thereof, a plurality of anodes concentrically arranged with relation to said cathode, and an inclosure surrounding and confining the arc path between an anode and the cathode, said inclosure including a guiding element of a reduced dimension adjacent the cathode to confine the cathode surface.

In testimony whereof I have affixed my signature in presence of two witnesses.

BÉLA SCHAEFER.

Witnesses:
 JEAN GRUND,
 CARL GRUND.